United States Patent
Allenbach et al.

(10) Patent No.: US 8,708,289 B2
(45) Date of Patent: Apr. 29, 2014

(54) COMPONENT FOR A FASTENING CLIP AND FASTENING CLIP

(75) Inventors: Estelle Allenbach, Niedermodern (FR); Michel Kuhm, Ingwiller (FR)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 13/109,104

(22) Filed: May 17, 2011

(65) Prior Publication Data

US 2012/0009012 A1  Jan. 12, 2012

(30) Foreign Application Priority Data

Jul. 9, 2010  (FR) ...................... 10 55612

(51) Int. Cl.
*F16L 3/22* (2006.01)

(52) U.S. Cl.
USPC ........................................ 248/68.1; 248/74.4

(58) Field of Classification Search
USPC ........... 248/62, 63, 65, 68.1, 74.1, 74.2, 74.4; 24/459
See application file for complete search history.

(56) References Cited

U.S. PATENT DOCUMENTS

| | | | | |
|---|---|---|---|---|
| 3,526,934 A | * | 9/1970 | Owen, Sr. | 285/154.1 |
| 4,840,333 A | * | 6/1989 | Nakayama | 248/68.1 |
| 5,029,782 A | * | 7/1991 | Andre et al. | 248/68.1 |
| 5,104,072 A | * | 4/1992 | Kuo et al. | 248/68.1 |
| 5,769,556 A | * | 6/1998 | Colley | 403/24 |
| 5,996,945 A | * | 12/1999 | Coles et al. | 248/68.1 |
| 8,020,812 B2 | * | 9/2011 | Matsuno et al. | 248/71 |
| 2006/0108481 A1 | | 5/2006 | Riedy et al. | |
| 2007/0246614 A1 | * | 10/2007 | Allmann et al. | 248/65 |
| 2009/0224111 A1 | * | 9/2009 | Gilbreath | 248/68.1 |

* cited by examiner

*Primary Examiner* — Gwendolyn Baxter
(74) *Attorney, Agent, or Firm* — Tarolli, Sundheim, Covell & Tummino LLP

(57) ABSTRACT

A component for a fastening clip which is composed of two identical components of this type and serves to fasten at least one conduit, having a base plate and at least one seat for a conduit, the seat defining a substantially semi-cylindrical receiving space, the seat having first latching elements and second latching elements arranged opposite each other in pairs with respect to the cylinder axis and extending on one side of the base plate away therefrom, wherein with respect to a plane which is perpendicular to the cylinder axis, the first latching elements are arranged on a first side of the plane and said second latching elements are arranged on the second side of the plane, and wherein the first latching elements are formed such that they can latch on the second latching elements.

20 Claims, 4 Drawing Sheets

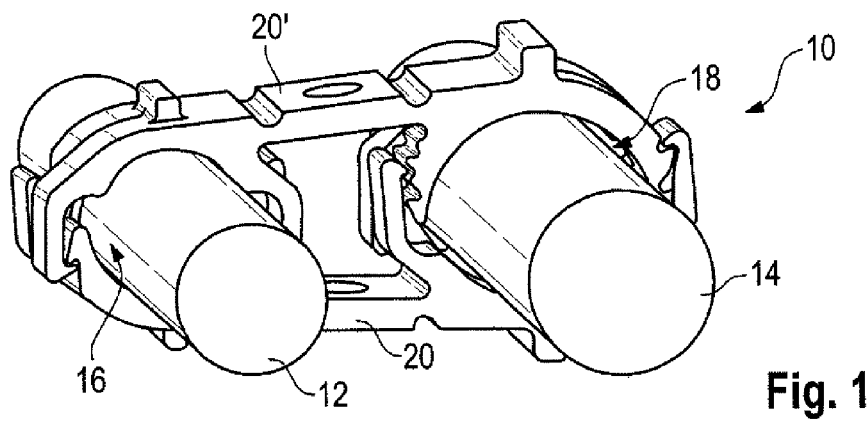
Fig. 1
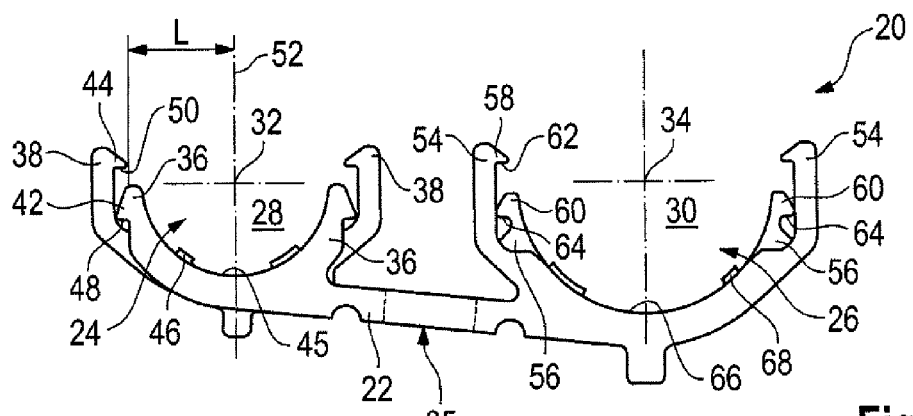
Fig. 2
Fig. 3

COMPONENT FOR A FASTENING CLIP AND FASTENING CLIP

TECHNICAL FIELD

The invention relates to a component for a fastening clip which is composed of two identical components of this type and serves to fasten at least one conduit, and to such a fastening clip.

BACKGROUND OF THE INVENTION

Fastening clips are used in different fields to secure or fasten conduits, such as cables or tubes, for example. The fastening clip preferably encloses the conduit in the peripheral direction so that the latter cannot slip out of the fastening clip. To facilitate the fastening of the conduits, the fastening clips are for example formed in several pieces. A first component can for example be pre-mounted to a wall. The conduit is then inserted, and the second component is fastened to the first component.

The object of the invention is to provide a component for such a fastening clip which permits a simple and fast mounting of the fastening clip or of the conduit to the fastening clip and which can be manufactured cost-effectively.

BRIEF SUMMARY OF THE INVENTION

According to the invention, the object is achieved by a component for a fastening clip, which is composed of two identical components of this type and serves to fasten at least one conduit. The component has a base plate and at least one seat for a conduit, the seat defining a substantially semi-cylindrical receiving space. The seat includes first and second latching elements which are arranged opposite each other in pairs with respect to the cylinder axis and which extend on one side of the base plate away therefrom. With respect to a plane which is perpendicular to the cylinder axis, the first latching elements are arranged on a first side of the plane, and the second latching elements are arranged on the second side of the plane. The first latching elements are formed such that they latch on the second latching elements. The component is thus formed such that the first or second latching elements of a second component rotated through 180°, the plane of which that is perpendicular to the cylinder axis is congruent with the plane of a component, can latch in the second or first latching elements, respectively, of the first component. In this case, the two semi-cylindrical receiving spaces form a cylindrical receiving space which can completely enclose and thus securely hold a conduit in the peripheral direction. Therefore, only two identical components are required for the fastening clip so that it is not necessary to stock different components. Due to the symmetrical configuration, a component must merely be rotated through 180° perpendicularly to the cylinder axis of the receiving space and can be placed onto a second component. Due to the small number of different components, it is additionally possible to reduce the manufacturing costs of the fastening clip.

Preferably, a mounting free of play of the first component to the second component is provided. This is achieved in that the first latching elements and/or the second latching elements each directly adjoin the plane that is perpendicular to the cylinder axis. In the mounted state of the components, the first latching elements or the second latching elements of the components thus each directly adjoin each other in the direction of the cylinder axis as the planes of the two components, that are perpendicular to the cylinder axis, are arranged in one plane. As the first latching elements or the second latching elements adjoin each other in the direction of the cylinder axis, a displacement of the components in the direction of the cylinder axis is excluded.

To use the component for conduits having different sizes, it is conceivable that the first and/or the second latching elements each have a plurality of latching projections which are arranged on the latching elements at different distances from the base plate. The latching elements of the respective other component can latch on the different latching projections, which permits distances of different sizes of the components from each other or diameters of different sizes of the receiving space. Conduits having different diameters can thus each be held free of play on the fastening clip. It is even conceivable that the fastening clip is pre-stressed around the conduit so that the conduit is clamped in the direction of the cylinder axis and cannot be displaced.

The component can additionally include at least one centering projection which extends away from the base plate on the side of the latching elements and which is arranged only on one side of the plane with respect to the center plane. These centering projections can serve as an additional centering support when assembling the components. However, it is also conceivable that in the mounted state, the centering projections of both components adjoin each other in the direction of the cylinder axis and thus prevent a displacement of the components.

The mutual locking of the components in the direction of the cylinder axis can also be effected by means of the centering projections only. To this end, the base plate is preferably provided with at least two centering projections which extend away from the base plate on the side of the latching elements and which are arranged on the base body at different distances from the cylinder axis. The first centering projection is arranged on the first side of the plane that is perpendicular to the cylinder axis, and the second centering projection is arranged on the second side of the plane. The centering projections are thus arranged diametrically opposite to each other so that the first centering projections of both components prevent a displacement in one direction of the cylinder axis and the second centering projections prevent a movement in the opposite direction when the fastening clip is assembled.

In order to permit a mutual locking free of play of the components in the direction of the cylinder axis, the centering projections preferably directly adjoin the plane that is perpendicular to the cylinder axis. In the assembled state of the fastening clip, both the first centering projections and the second centering projections thus directly adjoin each other in the direction of the cylinder axis, such that the components of the fastening clip are held free of play and a displacement in the direction of the cylinder axis is excluded.

The seat can for example have a contact surface which delimits the receiving space, is formed in a concave manner and has in particular a cross-section having the shape of a segment of a circle. The seat thus has a contact surface adapted to the periphery of the conduit, as a result of which it is possible to achieve a resting surface of the conduit to the component which is as large as possible.

The seat can for example also have ribs directed towards the receiving space, which in particular extend in the direction of the cylinder axis.

It is preferably provided that the component has at least two seats for one respective conduit, the seats extending away from the base plate on the same side. Due to a symmetrical design, a component of this type can also be used for several seats. The component is for example formed such that a first seat of a first component can be connected with the first seat of a second component. However, it is also conceivable that the first seat of the first component can be connected with the second seat of a second component. Due to the symmetry of the component, the latter can be used in a very flexible manner so that a faster and flexible mounting is possible.

It is also possible that the receiving spaces of the seats have different diameters. The fastening clip can thus be used for conduits having different diameters.

In order to permit the latching of the first latching elements on the second latching elements, the latching projections of the first latching elements are preferably directed towards the receiving space, and the latching projections of the second latching elements are directed away from the receiving space.

The component can for example have a recess which can be used to fasten the component or to receive a tool for mounting the component.

The component is preferably injection-molded in one piece of a plastic material, which permits a cost-effective manufacture of the component.

To achieve the object, a fastening clip for fastening at least one conduit having a substantially cylindrical receiving space is furthermore provided, the fastening clip including two components of the type mentioned above. The receiving space is formed by the seats of the components. The first latching elements of the first component latch on the second latching elements of the second component, and the second latching elements of the first component latch on the first latching elements of the second component.

The fastening clip can for example also have a plurality of receiving spaces, the receiving spaces being adapted to have different diameters so that the fastening clip can receive conduits of different sizes.

The latching elements of the components can for example have a plurality of latching projections so that the diameter of the seat can be varied by the latching of the respective latching elements on different latching projections of the corresponding latching elements. On the one hand, the fastening clip can thus be used for different diameters, on the other hand, a pre-stress can thus be generated onto the conduit so that the latter is clamped in the seat and cannot be displaced with respect to the fastening clip in the direction of the cylinder axis.

BRIEF DESCRIPTION OF THE DRAWINGS

FIG. 1 shows a fastening clip according to the invention with two conduits held therein;

FIG. 2 shows a first view of a component of the fastening clip of FIG. 1;

FIG. 3 shows a perspective view of the component of FIG. 2;

DETAILED DESCRIPTION OF THE PREFFERED EMBODIMENTS

Figure 4:
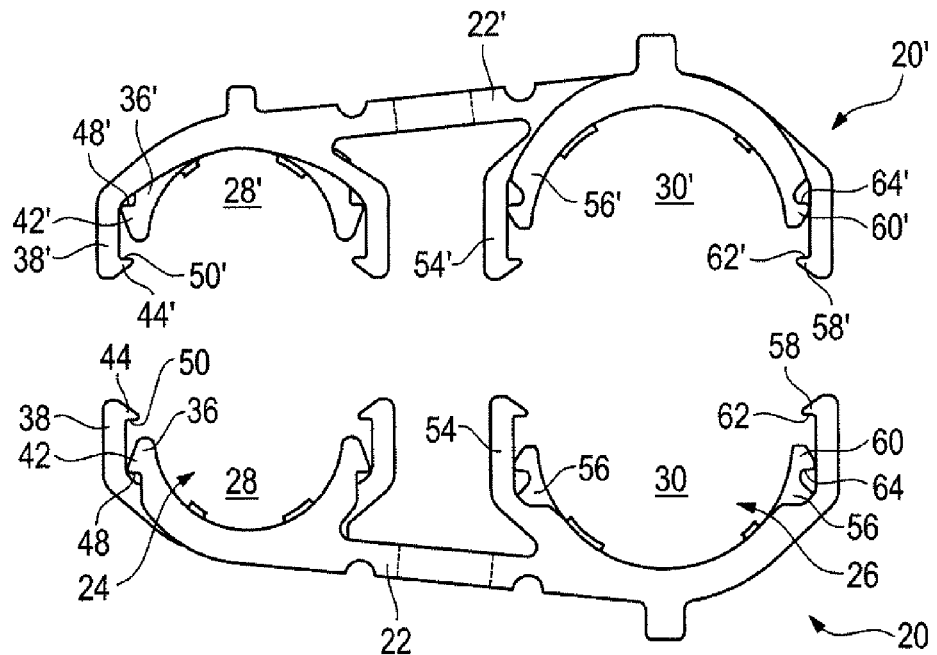
FIG. 4 shows a lateral view of the fastening clip of FIG. 1 before mounting.
Figure 5:
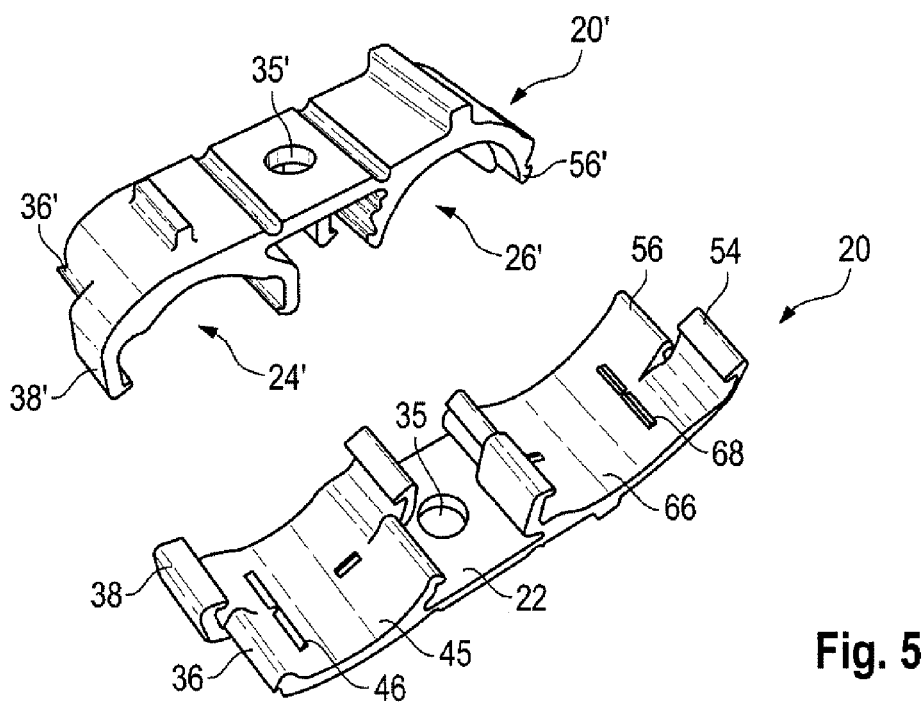
FIG. 5 shows a perspective view of the fastening clip of FIG. 4.
Figure 6:
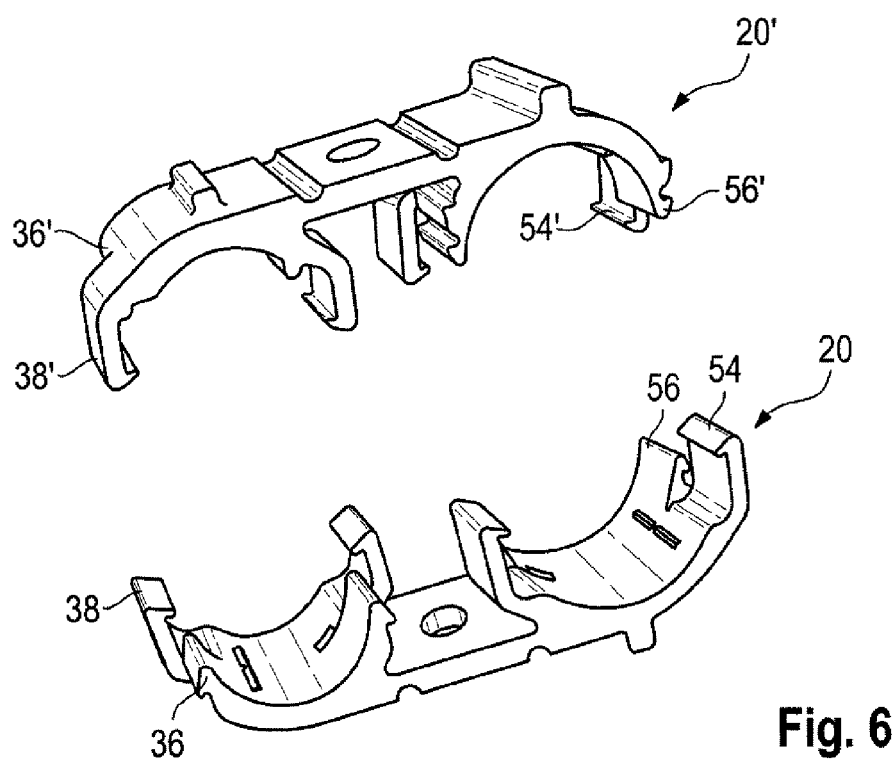
FIG. 6 shows a second perspective view of the fastening clip of FIG. 4.

The fastening clip 10 shown in FIG. 1 serves to receive and fasten two conduits 12, 14. The fastening clip 10 has for each of the conduits 12, 14 a respective receiving space 16, 18, which is here formed so as to be cylindrical so that the conduits 12, 14 are enclosed and securely held in the peripheral direction. The fastening clip 10 is composed of two components 20, 20' which are configured in an identical manner, as shown below.

The structure of the components 20, 20' is illustrated in FIGS. 2 and 3 on the basis of the component 20 of the fastening clip 10. The component 20 has a base plate 22 and two seats 24, 26 for one respective conduit, which extend on the same side of the base plate 22 away therefrom. The seats 24, 26 each define a semi-cylindrically formed receiving space 28, 30. The cylinder axes 32, 34 of the receiving spaces 28, 30 extend here parallel to each other and perpendicularly to the plane of projection with respect to FIG. 2. The base plate 22 is provided with a recess 35 into which a fastening means or a mounting tool, for example, can engage.

The structure of the seats 24, 26 is explained below on the basis of the first seat 24. As shown in particular in FIG. 2, the first seat 24 has respective first latching elements 36 and second elements 38 which extend on one side of the base plate 22 away therefrom. The first latching elements 36 and the second latching elements 38 are arranged opposite each other in pairs with respect to the cylinder axis 32 and are arranged in sequence in the direction of the cylinder axis 32. Here, those latching elements are referred to as first latching elements 36 which are arranged in the foreground in FIG. 2, whereas the second latching elements 38 are the latching elements arranged behind the first latching elements 36 in the direction of the cylinder axis 32.

With respect to a plane E, which is perpendicular to the cylinder axis 32 and is outlined in FIG. 3, the first latching elements 36 are arranged on one side of the plane, and the second latching elements 38 are arranged on the second side of the plane. This plane thus forms so to speak a 'parting plane' which with respect to FIG. 2 divides the component in a front part and a rear part arranged behind the front part in the direction of the cylinder axis. The first latching elements 36 are here completely arranged on the front part of the component 20, and the second latching elements 38 on the rear part.

The latching projections 42 of the first latching elements 36 are here directed away from the receiving space 28, and the latching projections 44 of the second latching elements 38 are directed towards the receiving space 28. As can be seen in particular in FIG. 2, the latching surfaces 48 of the first latching elements 36 and the latching surfaces 50 of the second latching elements 38 have the same distance L from a plane of symmetry 52 extending through the cylinder axis 32 of the receiving space 28.

That means that the first latching elements 36 are formed such that they can latch with the second latching elements 38 of a second component 20', as explained below.

The inner surface of the receiving space 28 is furthermore provided with a contact surface 45 and a plurality of ribs 46 which extend in the direction of the cylinder axis 32.

By analogy with the first seat 24, the second seat 26 has first latching elements 54 and second latching elements 56 having latching projections 58 or 60, respectively, and latching surfaces 62 or 64, respectively. A contact surface 66 and a plurality of ribs 68 are arranged on the inner surface of the seat 26. In contrast to the first seat 26, the latching projections 58 of the first latching elements 54 are directed to the inside, i.e. to the receiving space 30, and the latching projections 60 of the second latching elements 56 are directed to the outside, away from the receiving space 30. The orientation of the latching projections 58, 60 could however also be carried out symmetrically to the first seat 24.

As can be seen in FIG. 4, the fastening clip 10 can be composed of two identical components 20, 20'. One of the components 20' is here rotated through 180° about an axis perpendicular to the plane of symmetry 52 and orientated such that the 'parting planes' of the components 20, 20' are congruent. The second latching elements 38', 56' are here in the foreground, and the first latching elements 36', 54' are arranged behind them. In this case, the first latching elements 36, 54 of the component 20 are directed against the second latching elements 38', 56' of the component 20', and the second latching elements 38, 56 of the component 20 are directed against the first latching elements 36', 54' of the component 20'.

The component 20' can be pushed from the top onto the component 20 in a mounting direction R with respect to FIG. 4. As the latching surfaces 48, 48', 50, 50' of the latching elements 36, 36', 38, 38' have the same distance from each other, the second latching elements 38' can latch on the first latching elements 36 of the component 20, and the second latching elements 38 can latch with the first latching elements 36' of the component 20'.

Figure 7:
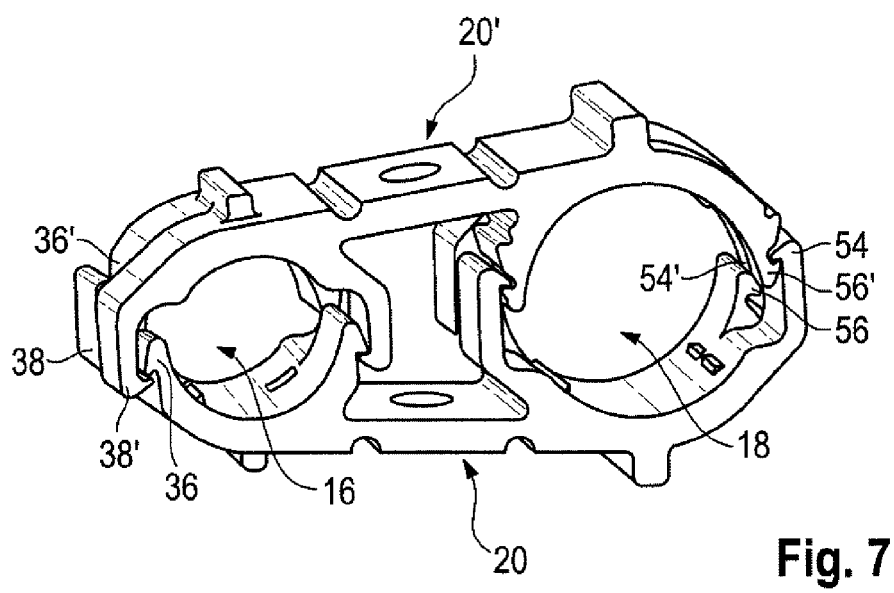
FIG. 7 shows a perspective view of the fastening clip of FIG. 1.

By analogy therewith, the latching elements 54, 56 of the second seat 26 can latch with the latching elements 54', 56' of the second seat 26'. The respectively semi-cylindrical receiving spaces 24, 24' and 26, 26' form in the assembled state the cylindrical receiving spaces 16, 18 of the fastening clip 10 (FIG. 7). The fastening clip 10 according to the invention can thus be assembled from two identical components 20, 20'.

As can be seen in FIG. 3, the first latching elements 36, 54 directly adjoin each other in the direction of the cylinder axis 32, 34 and thus directly adjoin the 'parting plane'. In the mounted state, the second latching elements 38, 38' and 56, 56' and the first latching elements 36, 36' and 54, 54' adjoin each other in the direction of the cylinder axes 32, 34 (FIG. 7). A displacement of the upper component 20' to the rear, i.e. into the plane of projection, is prevented by the adjoining second latching elements 38, 38' of the first seats 24, 24' and the latching elements 54, 54' of the second seats 26, 26'. By analogy therewith, a movement of the upper component 20' to the front out of the plane of projection is prevented by the first latching elements 36, 36' of the first seats 24, 24' and the second latching elements 56, 56' of the second seats 26, 26'.

A inadvertent release of the components 20, 20' by a displacement of the components 20, 20' in the direction of the cylinder axes 32, 34, for example by a tension onto one of the conduits 12, 14, is thus reliably excluded.

However, part of the latching elements 36, 36', 38, 38', 54, 54', 56, 56' can also be arranged at a distance from the 'parting plane' so that the components 20, 20' have a 'play' in the direction of the cylinder axes 32, 34, which facilitates the mounting of the components 20, 20'.

Figure 8A:
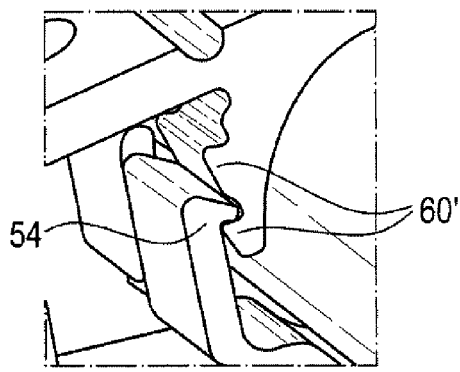
FIG. 8 a and b show a first and a second detail view of the latching elements of the fastening assembly of FIG. 1.
Figure 8B:
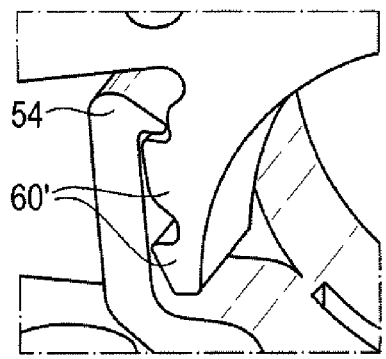

As can be seen in FIG. 7 and in particular in the detail views in FIGS. 8a and b, the second latching elements 56 of the second seat 26 each have two latching projections 60. The latching projections 62' of the first latching element 54' can optionally latch in one of the two latching projections 60, as a result of which the diameter or the size of the receiving space 18 can be varied. The fastening clip 10 can thus be used for different diameters of the conduits. In addition, with a corresponding distance of the latching projections 60, the conduit 14 can be clamped in the receiving space 18 so that the latter is held with tensile strength in the fastening clip 10. in this case, the conduits 12, 14 adjoin the contact surfaces 45, 45', 66, 66' or the ribs 46, 46', 68, 68' and are held by them.

The semi-cylindrical receiving spaces 28, 28', 30, 30' of the components 20, 20' are thus delimited by the contact surfaces 45, 45', 66, 66' provided on the inner surface of the seats 24, 24', 26, 26' or by the ribs 46, 46', 68, 68' provided on the inner surface of the seats 24, 24', 26, 26'. It is also conceivable that the ribs 46, 46', 68, 68' are arranged such that a conduit 12, 14 having a smaller diameter can rest between the ribs 46, 46', 68, 68' against the contact surfaces 45, 45', 66, 66', whereas a conduit having a larger diameter rests only against the ribs 46, 46', 68, 68'.

It is of course also conceivable that the other latching elements 36, 38, 58 also have two latching projections. In particular, the number of latching projections is variable so that an individual adaptation to different conduit diameters is possible.

Figure 9:
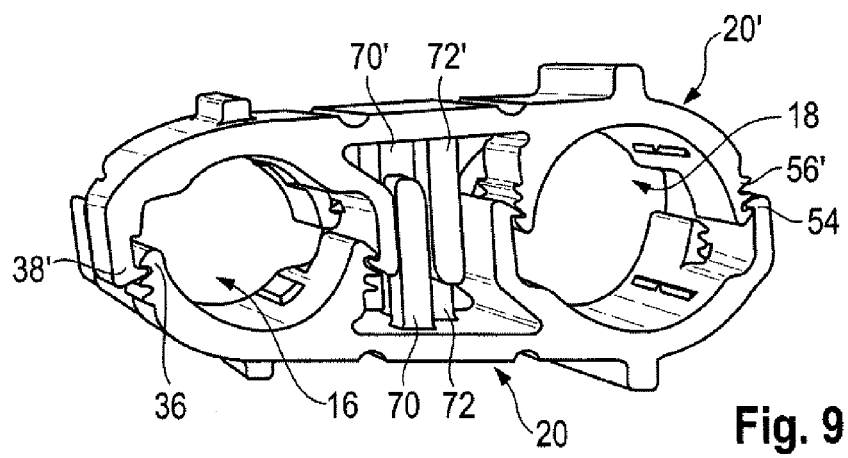
FIG. 9 shows a second embodiment of a fastening clip according to the invention.

As the latching elements 58, 54, 36, 38 directly adjoin the center plane, the latching elements 38, 38' and 36, 36' directly adjoin each other in the mounted state, as a result of which they are held free of play in the direction of the cylinder axis. Unlike this, the latching elements can however also have a larger distance from the 'parting plane'. In such a case, it is conceivable that the latching element 20 is provided with additional centering projections 70, 72, as shown in the embodiment of FIG. 9.

Here, the structure of the components 20, 20' substantially corresponds to the example embodiment shown above. Each component is additionally provided with two centering projections 70, 72 between the seats 26, 24, which respectively extend away from the base plate 22, 22' in the direction of the opposite component 20, 20'. The centering projections 70, 72 are thus provided on that side of the base plate 22 on which the latching elements 36, 38, 54, 56 are provided.

By analogy with the latching elements, the projections 70, 72 are each provided on one side of the 'parting plane', the first projection 70 being provided on the first side of the plane, and the second projection 72 being provided on the second side of the plane. With respect to the cylinder axis 32, 34, the centering projections 70, 72 are arranged side by side, the centering projections 70, 72 being not overlapping in the direction of the cylinder axis 32, 34.

The centering projections 70, 72 project so far in the direction of the respective other component 20, 20' that they serve as an insertion support when the components 20, 20' are assembled. In the mounted state, they additionally adjoin each other in the direction of the cylinder axis 32, 34 or overlap each other in the direction of the cylinder axis 32, 34 so that they prevent a displacement of the components 20, 20' in the direction of the cylinder axes 32, 34.

The receiving spaces 16, 18 have different diameters for receiving conduits 12, 14 of different thicknesses. The receiving spaces 16, 18 can however also have the same diameter. Unlike the embodiments shown here which each have two receiving spaces 16, 18, other embodiments are also conceivable having for example only one receiving space 16 or also several receiving spaces.

The components 20, 20' are each injection-molded in one piece of a plastic material, other materials and manufacturing methods being however also conceivable.

The invention claimed is:

1. A component (20) for a fastening clip (10) which is composed of two identical of this component (20, 20') and serves to fasten at least two conduits (12, 14), having a base plate (22) and at least two seats (24, 26) for conduits (12, 14), each seat (24, 26) defining a substantially semi-cylindrical receiving space (28, 30) comprising a cylinder axis (32, 34), the cylinder axes (32, 34) being spaced from each other and extending parallel to each other, each seat (24, 26) having four latching elements that include a pair of first latching elements (36, 54) and a pair of second latching elements (38, 56) arranged opposite each other with respect to the cylinder axis (32, 34) and extending on one side of said base plate (22) away therefrom, wherein with respect to a plane (40) which is perpendicular to said cylinder axis (32, 34), said pair of first latching elements (36, 54) are arranged on a first side of said plane (40) and said pair of second latching elements (38, 56) are arranged on a second side of said plane (40), and wherein said pair of first latching elements (36, 54) are formed such that they can latch on said pair of second latching elements (38, 56).

2. The component according to claim 1, wherein said pair of first latching elements (36, 54) and said pair of second latching elements (38, 56) each directly adjoin said plane (40).

3. The component according to claim 1, wherein at least one of said pair of first latching elements (36, 54) and said pair of second latching elements (38, 56) have a plurality of latching projections (42, 44, 58, 60) which are arranged on said latching elements (36, 38, 54, 56) at different distances from said base plate (22).

4. The component according to claim 1, wherein said component (20) has at least one centering projection (70, 72) which extends away from said base plate (22) on the side of said latching elements (36, 38, 54, 56) and which is arranged only on one side of said plane (40) with respect to said plane (40), the at least one centering projection (70, 72) extending away from the base plate (22) in a direction that the latching elements (36, 38, 54, 56) extend away from the base plate (22).

5. The component according to claim 4, wherein said centering projections (70, 72) directly adjoin said center plane.

6. The component according to claim 1, wherein said base plate (22) is provided with at least two centering projections (70, 72) which extend away from said base plate (22) on the side of said latching elements (36, 38, 54, 56) and which are arranged side by side on said base plate (22) with respect to said cylinder axis (32, 34), said first centering projection (70) being arranged on the first side of said plane (40) and second centering projection (72) being arranged on the second side of said plane (40).

7. The component according to claim 1, wherein each of said seats (24, 26) has a contact surface (45, 66) which delimits said receiving space (28, 30), is configured in a concave manner and has in particular a cross-section having the shape of a segment of a circle.

8. The component according to claim 1, wherein each of said seats (24, 26) includes ribs (46, 68) directed towards said receiving space (28, 30), which in particular extend in the direction of said cylinder axis (32, 34).

9. The component according to claim 1, wherein each of said seats (24, 26) extends on the same side away from said base plate (22).

10. The component according to claim 9, wherein said receiving spaces (28, 30) of said seats (24, 26) have different diameters.

11. The component according to claim 1, wherein said pair of first latching elements (36, 54) includes latching projections (42, 58) facing away from said receiving space (28, 30), and in that said pair of second latching elements (38, 56) includes latching projections (44, 60) directed towards said receiving space (28, 30).

12. The component according to claim 1, wherein said component (20) has a recess for at least one of fastening said component (20) and receiving a tool.

13. The component according to claim 1, wherein said component (20) is injection-molded in one piece of plastic material.

14. A fastening clip (10) for fastening at least two conduits (12, 14), the fastening clip (10) having a substantially cylindrical receiving space (16, 18), wherein said fastening clip (10) includes two components (20, 20'), the first component (20) having a base plate (22) and at least two seats (24, 26), each seat (24, 26) defining a substantially semi-cylindrical receiving space (28, 30) comprising a cylinder axis (32, 34), the cylinder axes (32, 34) of the first component (20) being spaced from each other and extending parallel to each other, the second component (20') having a base plate (22') and at least two seats (24', 26'), each seat (24', 26') defining a substantially semi-cylindrical receiving space (28', 30') comprising a cylinder axis (32', 34') the cylinder axes (32', 34') of the second component (20') being spaced from each other and extending parallel to each other, each seat (24, 26; 24', 26') having four latching elements that include a pair of first latching elements (36, 54; 36', 54') and a pair of second latching elements (38, 56; 38', 56') arranged opposite each other with respect to the cylinder axis (32, 34; 32', 34') and extending on one side of said base plate (22; 22') away therefrom, said receiving space (16, 18) being formed by the seats (24, 24'; 26, 26') of said components (20, 20'), and the pair of first latching elements (36, 54) of said first component (20) being adapted to cooperate with the pair of second latching elements (38', 56') of said second component (20'), and the pair of second latching elements (38, 56) of said first component (20) being adapted to cooperate with the pair of first latching elements (36', 54') of said second component (20').

15. The fastening clip according to claim 14, wherein said receiving spaces (16, 18) of said seats have different diameters.

16. The fastening clip according to claim 14, wherein at least one of said pair of first latching elements (36, 36', 54, 54') and said pair of second latching elements (38, 38', 56, 56') have a plurality of latching projections which are arranged on said latching elements at different distances from said base plate (22, 22').

17. The component according to claim 1, wherein one of the pair of first latching elements and one of the pair of second latching elements are adjacent a first side of the seat relative to the cylinder axis, and the other of the pair of first latching elements and the other of the pair of second latching elements are adjacent a second side of the seat relative to the cylinder axis.

18. The component according to claim 1, wherein the component includes a first seat and a second seat, one of the pair of first latching elements and one of the pair of second latching elements being adjacent a first side of each of the first and second seats relative to the cylinder axes, the other of the pair of first latching elements and the other of the pair of second latching elements being adjacent a second side of each of the first and second seats relative to the cylinder axes.

19. The component according to claim 1, wherein the pair of first latching elements and the pair of second latching elements each extend away from the base plate toward the base plate of the other component.

20. A component (20) for a fastening clip (10) which is composed of two identical of this component (20, 20') and serves to fasten at least two conduits (12, 14), having a base plate (22) and at least two seats (24, 26) for conduits (12, 14), each seat (24, 26) defining a substantially semi-cylindrical receiving space (28, 30) comprising a cylinder axis (32, 34),
- each seat (24, 26) having a pair of first latching elements (36, 54) and a pair of second latching elements (38, 56) arranged opposite each other with respect to the cylinder axis (32, 34) and extending on one side of said base plate (22) away therefrom,
- wherein with respect to a plane (40) which is perpendicular to said cylinder axis (32, 34), said pair of first latching elements (36, 54) are arranged on a first side of said plane (40) and said pair of second latching elements (38, 56) are arranged on a second side of said plane (40),
- wherein said pair of first latching elements (36, 54) are formed such that they can latch on said pair of second latching elements (38, 56), and
- wherein said component (20) has at least one centering projection (70, 72) which extends away from said base plate (22) on the side of said latching elements (36, 38, 54, 56) and which is arranged only on one side of said plane (40) with respect to said plane (40), the at least one centering projection (70, 72) extending away from the base plate (22) in a direction that the latching elements (36, 38, 54, 56) extend away from the base plate (22).

\* \* \* \* \*